United States Patent Office 3,282,957
Patented Nov. 1, 1966

3,282,957
4-PROPYL-HYGRAMIDE SALTS
Barney J. Magerlein, Portage, and Robert D. Birkenmeyer, Comstock Township, Kalamazoo County, Mich., assignors to Upjohn Company, Kalamazoo, Mich., a corporation of Delaware
No Drawing. Filed Apr. 13, 1964, Ser. No. 359,487
2 Claims. (Cl. 260—326.3)

This invention relates to novel compositions of matter and to processes for the preparation thereof, and is particularly concerned with trans-4-propyl-L-hygramide; cis-4-propyl-D-hygramide; cis-4-propyl-D-hygric acid, esters, salts including quaternary ammonium salts thereof, and to processes for producing the same and separating the same from mixtures.

The novel compounds of this invention and the process of production thereof can be illustratively represented by the following formulae:

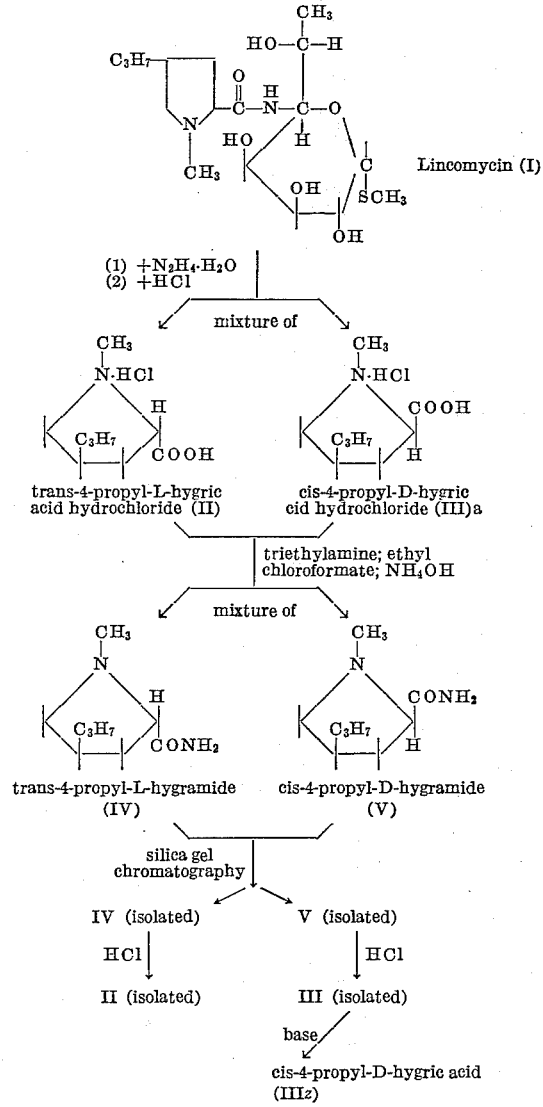

The α-amino acids (shown as hydrochlorides in Formulae II and III) of this invention can be represented more accurately as dipolar ions or zwitterions when at the isoelectric point. For example, as a zwitterion the cis-4-propyl-D-hygric acid has the Formula IIIz, which in acid solution is converted to the cationic form (IIIc)

The process of the present invention comprises: heating the antibiotic lincomycin (I) (methods for the pro-

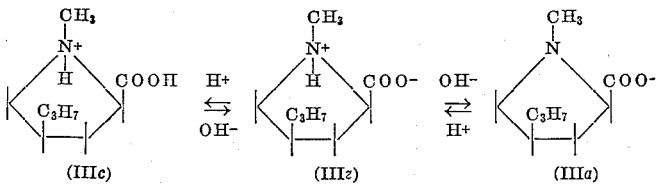

duction, recovery and purification of which are described in U.S. Patent 3,086,912) with hydrazine hydrate to obtain a mixture of 4-propylhygric acid hydrazides which is hydrolyzed with an aqueous mineral acid, such as hydrochloric acid, to a mixture of trans-4-propyl-L-hygric acid and cis-4-propyl-D-hygric acid as their mineral acid salts (II and III if hydrochloric acid is used); converting the mixture of 4-propylhygric acid mineral acid salts by consecutive treatment with triethylamine, ethyl chloroformate, and ammonium hydroxide to a mixture of trans-4-propyl-L-hygramide (IV) and cis-4-propyl-D-hygramide (V); separating the mixture consisting of compounds IV and V by chromatography or other means into the individual constituents, trans-4-propyl-L-hygramide (IV) and cis-4-propyl-D-hygramide (V); and hydrolyzing individually these amides IV and V to the respective mineral acid salts of Formulas II and III, which with silver oxide or silver carbonate can be converted to the free amino acids, trans-4-propyl-L-hygric acid and cis-4-propyl-D-hygric acid, in their zwitterion form as discussed earlier.

The novel compounds of this invention, trans-4-propyl-L-hygramide (IV) and cis-4-propyl-D-hygramide (V) as well as a mixture thereof, are important as intermediates in the production of pure trans-4-propyl-L-hygric acid and pure cis-4-propyl-D-hygric acid as will be seen in the examples. They also have importance as intermediates in the production of quaternary ammonium salts which are active as antimicrobial agents and in addition can be used in electrocardiographic jellies in view of their electroconductivity and wetting power. The quaternary ammonium salts of trans-4-propyl-L-hygric acid amide or cis-4-propyl-D-hygric acid amide or mixtures thereof are obtained by treating these compounds with an alkyl halide, such as methyl iodide, ethyl iodide, butyl bromide, hexyl iodide, octyl bromide, decyl iodide, dodecyl iodide, tetradecyl iodide, hexadecyl iodide, octadecyl iodide, eicosyl iodide and the like, to give the corresponding methiodide, ethiodide, butyl bromide, hexyl iodide, octyl bromide, decyl iodide, dodecyl iodide, tetradecyl iodide, hexadecyl iodide, octadecyl iodide, eicosyl iodide, and the like of trans-4-propyl-L-hygramide or respectively cis-4-propyl-D-hygramide. A suitable composition of an electrocardiographic jelly can be prepared as follows:

| | Parts |
|---|---|
| Glycerol | 5 |
| Starch | 10 |
| Quaternary ammonium salt | 60 |
| Water | 100 |

The jelly is prepared by mixing the starch, glycerol and water, and then adding the selected alkyl halide quaternary salt of trans-4-propyl-L-hygramide or cis-4-propyl-D-hygramide or of mixtures thereof.

The novel mixture consisting of trans-4-propyl-L-hygric acid and cis-4-propyl-D-hygric acid or mineral acid salts thereof is useful as a source of both the pure trans-4-propyl-L-hygric acid and the pure cis-4-propyl-D-hygric acid. The acid mixture, moreover, can be transformed into a mixture of its esters by treatment with an alcohol in the presence of, for example, anhydrous hydrogen chloride, and the thus-obtained esters can also be quaternized with alkyl halides as shown above for the acid amides. The thus-obtained quaternary ammonium salts, e.g. the methiodide, ethiodide, hexyl iodide, dodecyl iodide, octadecyl iodide and the like of methyl trans-4-propyl-L-hygrate and methyl cis-4-propyl-D-hygrate, butyl trans-4-propyl-L-hygrate and butyl cis-4-propyl-D-hygrate, and the like, have antimicrobial activity, are electroconductive, and those with an alkyl group having from 10–20 carbon atoms are also wetting agents, and can be used for washing instruments used in bacteriology or medicine, to cleanse floors, walls or ceilings in laboratories where bacteriological specimens are kept, or can be used in electrocardiographic jellies as indicated earlier for the corresponding amides.

The novel acid, cis-4-propyl-D-hygric acid, is useful as a buffer. As shown earlier for the mixture of 4-propyl-hygric acids, the cis-4-propyl-D-hygric acid as ester or amide can be transformed to a quaternary ammonium salt and in this form can be used for sanitary purposes such as cleaning instruments, washing walls, ceilings and floors in laboratories engaged in bacteriological work and washing instruments. In addition, cis-4-propyl-D-hygric acid can be used for the acylation of amino sugar moieties of antibiotics to create new types of antibiotics; for example, the acid can be combined with 2-hydroxyethyl 6-amino-6,8-dideoxy - 7 - O - methyl-1-thio-D-erythro-D-galacto-octopyranose (2-hydroxyethyl thiocelestosaminide), the sugar moiety of the new antibiotic celesticetin (Example 3, U.S. Patent 2,928,844).

The novel cis-4-propyl-D-hygric acid forms stable protonates (acid addition salts) on treatment with suitable acids, for example, hydrochloric, hydrobromic, hydriodic, sulfuric, phosphoric, nitric, chloric, perchloric, thiocyanic, fluosilicic, salicylic, glycolic, tartaric, maleic, malic, phenylacetic, lactic, methanesulfonic, cyclohexanesulfonic, and the like.

The invention also embodies the formation of various metal salts, for example those obtained when cis-4-propyl-D-hygric acid is treated with an alkali metal hydroxide or an alkaline earth metal hydroxide. For example, when cis-4-propyl-D-hygric acid is treated with one equivalent of a metal hydroxide such as sodium hydroxide, potassium hydroxide, calcium hydroxide, or the like, the corresponding sodium potassium, calcium, or the like salt of cis-4-propyl-D-hygric acid is obtained.

Substituted amine salts of cis-4-propyl-D-hygric acid are obtained in a like manner by substituting a nitrogenous base, such as a suitable alkyl substituted amine, for the inorganic base. Advantageously, the neutralization is effected in an organic solvent such as methanol, ethanol, propanol, butanol, amyl acetate, and the like. Quaternary ammonium hydroxides, such as tetramethyl ammonium hydroxide, can be used to prepare the corresponding tetramethyl ammonium cis-4-propyl-D-hygrate.

The acid addition salts and metal and substituted amine salts disclosed above are useful in upgrading the zwitterion.

The novel cis-4-propyl-D-hygric acid as zwitterion can be easily transformed to a quaternary ammonium salt by reaction with an alkyl halide, for example, an alkyl chloride, bromide or iodide. Other quaternary ammonium salts can be prepared by treating, for example, the methiodide or ethiodide of cis-4-propyl-D-hygric acid with silver oxide or silver carbonate to get the corresponding quaternary ammonium hydroxide and neutralizing the quarternary ammonium hydroxide with the toluenesulfonic acid, and the like.
toluene sulfonic acid, and the like.

The fluosilicic acid salt of cis-4-propyl-D-hygric acid is particularly useful for mothproofing according to U.S. Patents 1,915,334 and 2,075,359.

The following examples are illustrative of the process and products of the present invention but are not to be construed as limiting.

*Example 1.—Trans-4-propyl-L-hygric acid hydrochloride and cis-4-propyl-D-hygric acid hydrochloride*

A solution of 4 g. of lincomycin (U.S. Patent 3,086,912) in 20 ml. of hydrazine hydrate (98 to 100%) was refluxed for a period of 21 hours; excess hydrazine hydrate was removed in vacuo in a nitrogen atmosphere at steam bath temperature. The residue, a pasty mass of crystals, was cooled, acetonitrile was added, and the mixture was stirred until the crystals had dissolved. The mixture was then filtered and the filtrate evaporated to give a mixture of trans-4-propyl-L-hygric acid hydrazide and cis-4-propyl-D-hygric acid hydrazide. A 6 g. sample of the crude mixture (trans-4-propyl-L-hygric acid hydrazide and cis-4-propyl-D-hydric acid hydrazide) was refluxed for a period of 24 hours with 20 ml. of aqueous 6 N-hydrochloric acid. The dark brown reaction mixture was then evaporated to dryness in vacuo on a steam bath. The gummy, brown residue was boiled several times with t-butanol until the gum had broken up. The remaining brown precipitate was removed by filtration and discarded. The t-butanol filtrate was treated with a large amount of activated charcoal (Darco G–60), and warmed for thirty minutes, and filtered, yielding an orange filtrate which was evaporated to a gummy material in vacuo. The gummy material, which partially crystallized after standing overnight, was dissolved in 20 ml. of hot 2-propanol. To this solution was added three 50-ml. portions of acetone and the mixture was boiled after each addition, thereby causing precipitation of an orange-brown gum. Treatment with activated charcoal (Darco G–60) removed the gum and afforded a light yellow filtrate, which was stirred while 50 ml. of ether was slowly added. Crystals started to separate rapidly. After stirring for another 15 minutes, light yellow crystals were collected on a filter, washed with acetone and then ether and dried. These crystals were recrystallized from 30 volumes of hot acetonitrile containing activated charcoal (Darco G–60) to give colorless crystals which are a mixture of trans-4-propyl-L-hygric acid hydrochloride and cis-4-propyl-D-hygric acid hydrochloride.

*Example 2.—Mixture of trans-4-propyl-L-hygric acid and cis-4-propyl-D-hygric acid*

Three grams of a mixture of trans-4-propyl-L-hygric acid hydrochloride and cis-4-propyl-D-hygric acid hydrochloride was dissolved in 20 ml. of methanol and reacted at room temperature with 20 g. of silver oxide. The mixture was stirred for one hour at room temperature and thereupon filtered. The filtrate was evaporated in vacuo and twice recrystallized from acetone and ethyl acetate to give a mixture of trans-4-propyl-L-hygric acid and cis-4-propyl-D-hygric acid.

*Example 3.—Mixture of methyl trans-4-propyl-L-hygrate and methyl cis-4-propyl-D-hygrate and hydrochlorides thereof*

Twenty grams of a mixture of trans-4-propyl-L-hygric acid and cis-4-propyl-D-hygric acid was added to 200 ml. of anhydrous methanol and into this reaction mixture was bubbled dry hydrogen chloride for one hour. The flask was loosely stoppered and allowed to stand at room temperature overnight. The solvent was removed under reduced pressure and the residual oil was dissolved in 200 ml. of methanol which was removed under reduced pressure. The resulting oil was dissolved in 150 ml. of water, treated with activated charcoal (Darco G–60) and filtered. To the filtrate was added carefully solid potassium carbonate (40–50 g.) whereupon a colorless oil separated. The mixture was extracted twice with 100 ml. of ether, additional potassium carbonate was added to the aqueous phase, and this was again extracted with 100 ml. of ether. The ether extracts were combined, dried over anhydrous sodium sulfate and evaporated under reduced pressure. A residual oil weighing 18.6 g. was obtained; it consisted of a mixture of the methyl esters of trans-4-propyl-L-hygric acid and cis-4-propyl-D-hygric acid.

*Mixture 4.—Mixture of methiodides of methyl trans-4-propyl-L-hygrate and methyl cis-4-propyl-D-hygrate*

To 6.5 g. of the mixture of the methyl esters of trans-4-propyl-L-hygric acid and cis-4-propyl-D-hygric acid was added with continuous cooling 9 g. of methyl iodide; the reaction was quite vigorous. After additional cooling another 5 g. of methyl iodide was added and the mixture was allowed to stand overnight at room temperature. Excess methyl iodide was removed under reduced pressure, and the solid obtained was dissolved in 100 ml. of anhydrous ethanol. The ethanol was removed under reduced pressure and the resulting residue was recrystallized twice from a 1:1 mixture of ethanol:ether to yield crystals of a mixture of the methiodides of methyl trans-4-propyl-L-hygrate and methyl cis-4-propyl-D-hygrate.

*Example 5.—Mixture of methyl nitrates of methyl trans-4-propyl-L-hygrate and methyl cis-4-propyl-D-hygrate*

One gram of a mixture of the methiodides of methyl trans-4-propyl-L-hygrate and methyl cis-4-propyl-D-hygrate was dissolved in a mixture of 5 ml. of methanol and 5 ml. of water. To this solution was added, in the dark, 1 g. of silver nitrate, and the mixture was stirred for 5 minutes. Silver iodide was removed by filtration and the filtrate was evaporated almost to dryness, then diluted with methyl alcohol and water (1:1), filtered again, and evaporated in vacuo. The residue was recrystallized twice from methanol:water to give a mixture of the methyl nitrates of methyl trans-4-propyl-L-hygrate and methyl cis-4-propyl-D-hygrate.

*Example 6.—Cis-4-propyl-D-hygric acid amide and trans-4-propyl-L-hygric acid amide*

A solution of 6.85 g. of a mixture of trans-4-propyl-L-hygric acid and cis-4-propyl-D-hygric acid and 11.2 ml. of triethylamine in 400 ml. of acetonitrile was cooled to between 0 and 10° C. and to it was added 3.84 ml. of ethyl chloroformate. The mixture was stirred for ½ hour at a temperature between about 0° and about 10° C. and 20 ml. of ammonium hydroxide was added with continuous stirring while maintaining the temperature between 0 and 10° C. The reaction mixture, after standing at about room temperature (25° C.) for a period of about 18 hours, was evaporated in vacuo, giving a white, solid material consisting of trans-4-propyl-L-hygric acid amide and cis-4-propyl-D-hygric acid amide. After recrystallization from Skellysolve B hexanes, the product melted at 86–86.5° C.

*Analysis.*—Calcd. for $C_9H_{18}N_2O$: C, 63.49; H, 10.66; N, 16.46. Found: C, 63.35; H, 10.92; N, 17.78. $[\alpha]_D$ +10° (c.=.6792, water).

*Example 7.—Separation of trans-4-propyl-L-hygramide and cis-4-propyl-D-hygramide*

Five grams of a mixture of trans-4-propyl-L-hygramide and cis-4-propyl-D-hygramide (as obtained in Example 6) was chromatographed over 700 g. of silica gel using a solvent system of acetone:water (8.2). The column was eluated with the same solvent mixture. The first 1120 ml. were discarded and 20 fractions of 50 ml. were collected. Fraction number one was discarded and fractions 2, 3 and 4 were combined; these consisted of one material as shown by thin layer chromatography. Evaporation to dryness of these fractions and recrystallization of the residue from Skellysolve B hexane gave trans-4-propyl-L-hygramide, M.P. 117–118° C., $[\alpha]_D^{25}$ −92° (c.=0.6774, water).

*Analysis.*—Calcd. for $C_9H_{18}N_2O$: C, 63.49; H, 10.66; N, 16.46. Found: C, 63.57; H, 10.73; N. 16.71.

Fractions 5–20 were combined and rechromatographed several times until the material which was slower moving on thin-layer chromatography was obtained in a pure state. This material was recrystallized from Skellysolve B hexanes, giving cis-4-propyl-D-hygramide, M.P. 114–115° C., $[\alpha]_D^{25}$ +103° (c.=0.6960, water).

*Example 8.—Cis-4-propyl-D-hygramide hydrochloride*

To a solution of 1 g. of cis-4-propyl-D-hygramide in 20 ml. of water was added a 10% hydrochloric acid solution. The solution was thereupon evaporated in vacuo to give cis-4-propyl-D-hygramide hydrochloride.

*Example 9.—Cis-4-propyl-D-hygramide hydriodide*

In the manner given in Example 8, 1 g. of cis-4-propyl-D-hygramide in 20 ml. of water was reacted with an aqueous solution of hydrogen iodide. The solution was thereupon evaporated in vacuo to give the hydriodide of cis-4-propyl-D-hygramide.

In the manner given in Example 8, other inorganic or organic acid salts of cis-4-propyl-D-hygramide can be prepared by reacting cis-4-propyl-D-hygramide with the selected acid. Representative acid addition salts of cis-4-propyl-D-hygramide thus obtained include the nitrate, sulfate, bromate, acetate, propionate, lactate, decanoate, and laurate.

In the manner given in Example 8, acid addition salts of the mixture of trans-4-propyl-L-hygramide and cis-4-propyl-D-hygramide can be prepared by reacting the mixture with a selected acid. Representative acid addition salts thus prepared include salts of hydrochloric, hydrobromic, hydroiodic, sulfuric, nitric, chloric, acetic butyric, valeric, lactic, decanoic, lauric, and other acids with a mixture of trans-4-propyl-L-hygramide and cis-4-propyl-D-hygramide.

*Example 10.—Trans-4-propyl-L-hygramide hydrochloride*

In the manner given in Example 8, trans-4-propyl-L-hygramide in aqueous solution was reacted with hydrocloric acid to give trans-4-propyl-L-hygramide hydrochloride.

In the manner given in Example 8, other acid addition salts of trans-4-propyl-L-hygramide can be prepared by reacting trans-4-propyl-L-hygramide with the selected acid. In this manner addition salts of acetic, sulfuric, nitric, butyric, valeric, hexanoic, heptanoic, octanoic, nonanoic, decanoic, undecanoic, lauric, lactic, and like acids with trans-4-propyl-L-hygramide can be prepared.

*Example 11.—Methiodide of cis-4-propyl-D-hygramide*

A solution of 2.5 g. of cis-4-propyl-D-hygramide in 20 ml. of methanol was treated with methyl iodide with cooling. After the initial vigorous reaction had abated, 20 ml. of methanol and 5 ml. of methyl iodide were added. After stirring until the exothermic reaction was over, the methiodide of cis-4-propyl-D-hygramide was filtered and washed with methanol. The light yellow filtrate was evaporated to dryness in vacuo, and the residue was dissolved in 50 ml. of acetone and seeded with a small amount of crystals preformed in acetone and ethyl acetate. The resulting crystals were collected, washed with acetone and ether, and dried in vacuo at 40° C. to give an additional quantity of the methiodide of cis-4-propyl-D-hygramide.

In the same manner, other alkyl halides can be reacted with cis-4-propyl-D-hygramide to give quaternary ammonium salts. Representative compounds obtained in this manner include the ethiodide, propyl iodide, butyl iodide, pentyl iodide, hexyl iodide, octyl iodide, decyl iodide, dodecyl iodide, tetradecyl iodide, octadecyl iodide, and the like of cis-4-propyl-D-hygramide. In the manner given above, quaternary alkyl halide derivatives can be made of trans-4-propyl-L-hygramide and of the mixture of trans-4-propyl-L-hygramide and cis-4-propyl-D-hygramide. Representative compounds thus obtained include the methiodide, ethiodide, propyl iodide, butyl iodide, pentyl iodide, hexyl iodide, octyl iodide, decyl iodide, dodecyl iodide, tetradecyl iodide, octadecyl iodide of trans - 4 - propyl - L - hygramide and of the mixture of trans - 4 - propyl - L - hygramide and cis-4-propyl-D-hygramide.

*Example 12.—Trans-4-propyl-L-hygric acid hydrochloride*

Trans-4-propyl-L-hygramide (370 mg.) was heated with 20 ml. of 20% hydrochloric acid at 95° C. for a period of 4 hours. The reaction mixture was cooled, evaporated to dryness in vacuo, and the residue was slurried with a little warm ethanol and filtered to remove ammonium chloride. Ether was added to the filtrate and after cooling, a white solid separated. Seven recrystallizations from ethanol gave trans-4-propyl-L-hygric acid hydrochloride; melting point 187–190° C., $[\alpha]_D^{25}$ —50° (c.=1.205, water).

*Example 13.—Cis-4-propyl-D-hygric acid hydrochloride*

In the manner given in Example 12, cis-4-propyl-D-hygramide was hydrolyzed with hydrochloric acid to give cis-4-propyl-D-hygric acid hydrochloride.

*Example 14.—Cis-4-propyl-D-hygric acid*

To a solution of 4 g. of cis-4-propyl-D-hygric acid hydrochloride in 40 ml. of water was added 6 g. of silver carbonate in portions with continuous stirring. After foaming subsided, the mixture was heated on a steam bath for ½ hour and placed in a refrigerator for 20 hours. After the addition of ½ g. of decolorizing carbon the mixture was stirred again for ½ hour at room temperature and filtered, and the filtrate was concentrated to dryness. The dry material was redissolved in 15 ml. of ethyl alcohol and the alcoholic solution was again evaporated to dryness; the process was repeated until the dry residue became crystalline. Two recrystallizations from alcohol gave essentially pure cis-4-propyl-D-hygric acid.

*Example 15.—Ethyl cis-4-propyl-D-hygrate*

Into a solution of 2 g. of cis-4-propyl-D-hygric acid in 25 ml. of anhydrous ethanol was bubbled a stream of dry hydrogen chloride gas for a period of 45 minutes at room temperature. The mixture was allowed to stand overnight and the solvent was removed under reduced pressure. The residual oil was dissolved in ethanol which was removed under reduced pressure. The oil was then dissolved in 50 ml. of water, treated with activated carbon and filtered. The filtrate was evaporated in vacuo to yield ethyl cis-4-propyl-D-hygrate as a yellowish oil.

*Example 16.—Methiodide of ethyl cis-4-propyl-D-hygrate*

To 2 g. of ethyl cis-4-propyl-D-hygrate was added 2.5 g. of methyl iodide. After standing at room temperature for a period of 22 hours, the reaction mixture was dissolved in 20 ml. of methanol, treated with decolorizing carbon and filtered, and the filtrate was evaporated to dryness under reduced pressure. The residue was recrystallized twice from ethyl acetate-ethanol to give crystals of the methiodide of ethyl cis-4-propyl-D-hygrate.

In the same manner, other quaternary salts of ethyl cis-4-propyl-D-hygrate can be prepared by reacting a selected alkyl halide with ethyl cis-4-propyl-D-hygrate. Representative compounds thus obtained include the methiodide, propyl iodide, butyl iodide, pentyl iodide, hexyl iodide, heptyl iodide, octyl iodide, nonyl iodide, decyl iodide, undecyl iodide, dodecyl iodide, tetradecyl iodide, octadecyl iodide, and the like of ethyl cis-4-propyl-D-hygrate.

In the same manner, substituting other alkyl esters of cis-4-propyl-D-hygric acid, such as the methyl, propyl, butyl, hexyl, octyl, decyl, dodecyl, and like esters for ethyl cis-4-propyl-D-hygrate and other alkyl halides for methyl iodide, other quaternary compounds are prepared. Representative compounds thus obtained include the methiodide, propyl iodide, butyl iodide, pentyl iodide, hexyl iodide, heptyl iodide, octyl iodide, nonyl iodide, decyl iodide, undecyl iodide, dodecyl iodide, tetradecyl iodide, octadecyl iodide, methyl bromide, ethyl bromide, ethyl chloride, propyl chloride, butyl bromide, hexyl chloride, and the like of the methyl, propyl, butyl, pentyl, hexyl, octyl, decyl, dodecyl, and like esters of cis-4-propyl-D-hygric acid.

We claim:
1. Trans-4-propyl-L-hygramide hydrochloride.
2. Cis-4-propyl-D-hygramide hydrochloride.

References Cited by the Examiner

Fieser et al.: Organic Chemistry, 1956, pp. 226, 227, 242.

Noller: Chemistry of Organic Compounds, 1957, pages 16–17.

Sidgwick: Organic Chemistry of Nitrogen, 1937, page 398.

Theilheimer: Synthetic Methods of Organic Chemistry, vol. 15, Reaction No. 343 (1961).

ALEX MAZEL, *Primary Examiner.*

HENRY R. JILES, *Examiner.*

J. A. NARCAVAGE, *Assistant Examiner.*